United States Patent
Kojima et al.

(10) Patent No.: US 7,442,455 B2
(45) Date of Patent: *Oct. 28, 2008

(54) APPARATUS AND METHOD FOR PROTECTING FUEL CELL

(75) Inventors: Yasushi Kojima, Saitama (JP); Takashi Sasaki, Saitama (JP); Hiroshi Machida, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 587 days.

This patent is subject to a terminal disclaimer.

(21) Appl. No.: 10/623,011

(22) Filed: Jul. 17, 2003

(65) Prior Publication Data
US 2004/0018404 A1 Jan. 29, 2004

(30) Foreign Application Priority Data
Jul. 17, 2002 (JP) ............................. 2002-208225

(51) Int. Cl.
*H01M 8/12* (2006.01)
(52) U.S. Cl. ............................. 429/23; 429/22; 429/21; 429/19; 429/13; 429/25
(58) Field of Classification Search .................... 429/22
See application file for complete search history.

(56) References Cited

U.S. PATENT DOCUMENTS 4,904,548 A * 2/1990 Tajima ........................ 429/22

6,461,751 B1 * 10/2002 Boehm et al. ............... 429/13
2001/0014414 A1 * 8/2001 Okamoto et al. ............. 429/20

FOREIGN PATENT DOCUMENTS

| JP | 61-279071 | 12/1986 |
| JP | 1-239772 | 9/1989 |
| JP | 06-223850 | 8/1994 |
| WO | WO-01/43216 A2 | 6/2001 |

OTHER PUBLICATIONS

Notice of Reason for Rejection for Application No. 2002-208225, dated Apr. 18, 2006.

* cited by examiner

*Primary Examiner*—Patrick Ryan
*Assistant Examiner*—Cynthia Lee
(74) *Attorney, Agent, or Firm*—Lahive & Cockfield, LLP; Anthony A. Laurentano, Esq.

(57) ABSTRACT

A memory unit stores maps of predetermined determination threshold values for detection values detected by a hydrogen sensor according to an operating state of a fuel cell such as a difference in pressure between reaction gases at an anode and a cathode, supply pressure of the reaction gases, supply flow rate of the reaction gases and generated current of the fuel cell. A control unit obtains a predetermined determination threshold value from the memory unit based on the operating state of the fuel cell. Then, the detection value outputted from the hydrogen sensor and the determination threshold value obtained from the memory unit are compared, and in the event that the detection value is determined to exceed the determination threshold value, a predetermined protecting process is implemented for the fuel cell.

6 Claims, 4 Drawing Sheets

APPARATUS AND METHOD FOR PROTECTING FUEL CELL

FIELD OF THE INVENTION

The present invention relates to an apparatus and a method for protecting a fuel cell.

DESCRIPTION OF THE RELATED ART

In the related art, for example, a proton-exchange membrane fuel cell has a stack (hereinafter, referred to as a fuel cell) which is constituted by a plurality of stacked cells each comprising a proton-exchange electrolyte membrane which is held from both sides thereof by an anode and a cathode. In the proton-exchange membrane fuel cell so constructed, hydrogen is supplied to the anode as a fuel, and air is supplied to the cathode as an oxidant. Hydrogen ions generated at the anode as a result of catalytic reaction pass through the proton-exchange electrolyte membrane and move to the cathode, where the hydrogen ions electrochemically react with oxygen to thereby generate electricity.

In a fuel cell like this proton-exchange membrane fuel cell, in the related art, there is known a protection system like a fuel cell protection system disclosed in, for example, JP-A-6-223950, in which a hydrogen sensor is provided in a discharge system on the cathode side. In this system, when the hydrogen sensor detects a leakage of hydrogen on the anode side to the cathode side through the proton-exchange electrolyte membrane, the supply of fuel is shut off.

In addition, known as the hydrogen sensor is a gas contact combustion type hydrogen sensor which has as a pair a gas detecting element comprising a catalyst such as platinum and a temperature compensating element. In this hydrogen sensor, the density of hydrogen gas is detected according to, for example, a difference in electrical resistance generated between the gas detecting element which is heated to a relatively high temperature state by heat generated from a combustion which occurs when hydrogen is brought into contact with the catalyst such as platinum and the temperature compensating element which is in a relatively low temperature state which is at the ambient temperature.

Incidentally, in the fuel cell protection system according to the related art, it is simply set such that the fuel supply is stopped in the event that hydrogen is detected in the discharge system on the cathode side of the fuel cell, and no consideration is given to the state of the fuel cell. Due to this, for example, in the event that a threshold value for determining on a shutoff of the fuel supply is set at a value which is too high, the shutoff of the fuel supply is delayed, and this may lead to a risk that an abnormal state generated in the fuel cell progresses to an excessive extent.

SUMMARY OF THE INVENTION

The invention was made in view of this situation, and an object thereof is to provide an apparatus and a method for protecting a fuel cell appropriately.

With a view to attaining the object by solving the problem, according to a first aspect of the invention, there is provided an apparatus for protecting a fuel cell (for example, a fuel cell 2 in an embodiment) which generates electricity by supplying as reaction gases hydrogen to an anode and oxygen to a cathode for electrochemical reaction, the apparatus comprising a hydrogen sensor (for example, a hydrogen sensor 4 in the embodiment) for detecting hydrogen in off-gas discharged from the cathode, an operating state detecting unit (for example, a pressure detector 11a, a pressure detector 12a, a flow rate detector 12b, a current controller 5 in the embodiment) for detecting an operating state of the fuel cell, a memory unit (for example, a memory unit 8 in the embodiment) for storing a determination threshold value corresponding to a detection value of the hydrogen sensor which is set according to the operating state of the fuel cell, an abnormal state determining unit (for example, a step S04 in the embodiment) for comparing a detection value outputted from the hydrogen sensor and the determination threshold value obtained from the storing unit according to the operating state of the fuel cell outputted from the operating state detecting unit and determining whether or not the fuel cell is in abnormal state according to a result of the comparison, and a protecting unit (for example, a step S05 in the embodiment) for changing the operating state of the fuel cell according to a result of the determination by the abnormal state determining unit.

According to the fuel cell protection apparatus constructed as described above, the abnormal state determining unit compares a detection value outputted from the hydrogen sensor with the predetermined determination threshold value set according to the operating state of the fuel cell. Therefore, for example, even in the event that the amount of hydrogen in the off-gas changes according to the operating state of the fuel cell in a normal state which is within a predetermined allowable range relative to the operating state of the fuel cell, the occurrence of an abnormal state can be determined by an appropriate determination threshold value, and an appropriate process can be implemented by the protecting unit when the abnormality of the fuel cell is determined.

Furthermore, according to a second aspect of the invention, there is provided a fuel cell protection apparatus wherein the protecting unit reduces at least one of the difference in pressure between the reaction gases at the anode and the cathode, supply pressure of the reaction gases, supply flow rate of the reaction gases and generated current of the fuel cell.

According to the protection apparatus constructed as described above, in the event that the fuel cell is determined as being in an abnormal state by the abnormal state determining unit, by reducing by the protecting unit at least one of the difference in pressure between the reaction gases at the anode and the cathode, supply pressure of the reaction gases supply flow rate of the reaction gases and generated current of the fuel cell, it is possible to prevent the excessive progress of the abnormal state occurred in the fuel cell or, for example, the abnormal state occurred in a proton-exchange electrolyte membrane in an ensured fashion.

DETAILED DESCRIPTION OF THE INVENTION

Figure 1:
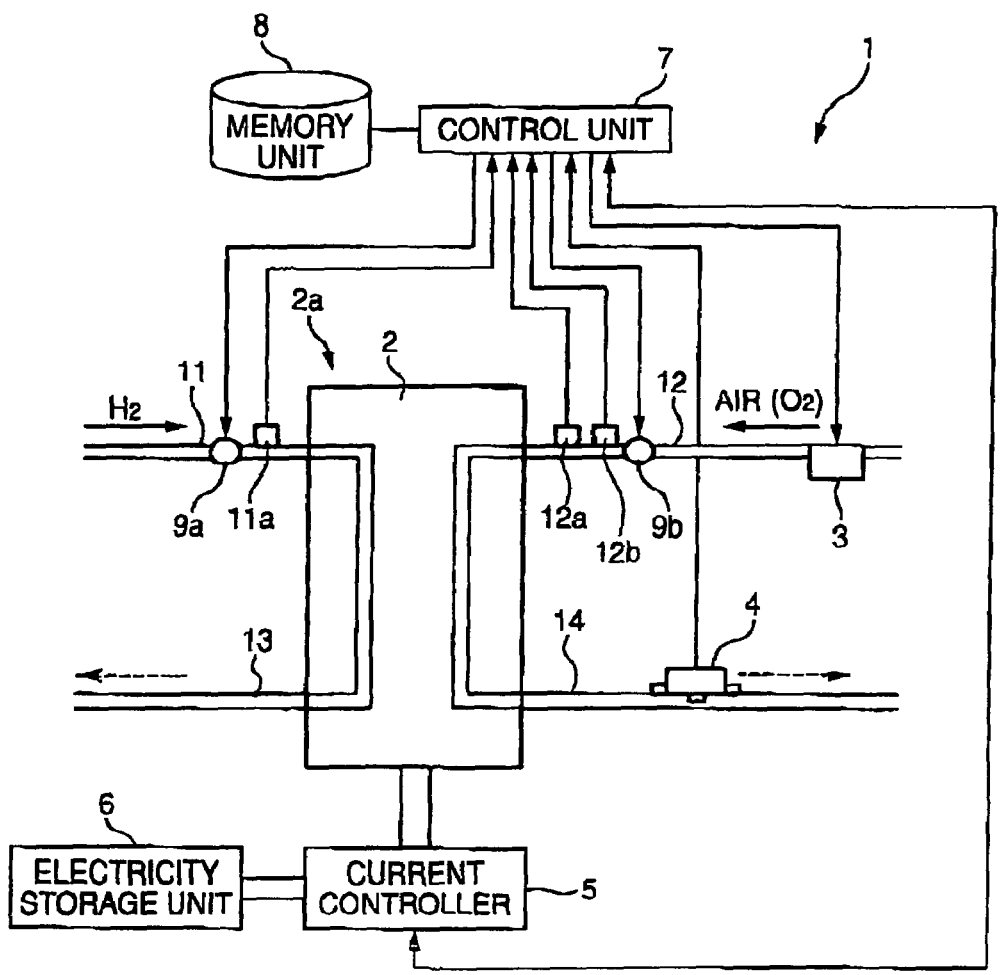
FIG. 1 is a drawing showing the configuration of a fuel cell system provided with a fuel cell protection apparatus according to an embodiment of the invention.

Referring to the accompanying drawings, a fuel cell protection apparatus according to an embodiment of the invention will be described below.

As shown in, for example, FIG. 1, a fuel cell protection apparatus (hereinafter, simply, referred to as a protection apparatus) 1 is equipped on a fuel cell system 2a. The fuel cell system 2a comprises a fuel cell 2, an air compressor 3 for supplying air containing oxygen to an cathode of the fuel cell 2, a hydrogen sensor 4, a current controller 5, an electricity storage unit 6, a control unit 7, and a memory unit 8. The protection apparatus is constructed to include, for example, the current controller 5, the control unit 7, an anode side pressure and flow rate regulator 9a and a cathode side pressure and flow rate regulator 9b.

The fuel cell 2 is made up of a multiplicity of stacked fuel cells (not shown) in each of which a proton-exchange electrolyte membrane comprising, for example, a cation exchange membrane is held by an anode and a cathode to constitute an electrolyte electrode structure, which is further held by a pair or separators.

As shown in, for example, FIG. 1, when a fuel gas such as hydrogen is supplied to the anode from an inlet side piping 11, hydrogen is ionized or dissociated on a catalyst applied to the anode, and the fuel gas so ionized or dissociated protons then moves to the cathode via the proton-exchange electrolyte membrane which is appropriately moistened. Electrons dissociated from hydrogen then are taken out to an external circuit to be used as direct current electrical energy. Since air containing an oxidant gas such as oxygen is supplied from the compressor 3 to the cathode via an inlet side piping 12, the hydrogen ions, electrons and oxygen react with one another on this cathode to thereby produce water. Then, so called off-gases resulting from the reaction are discharged to the outside of the system from outlet side pipings 13, 14 of the anode and the cathode, respectively.

Here, a pressure detector 11a for detecting the pressure of the fuel gas supplied to the anode side is provided in the inlet side piping 11 on the anode side of the fuel cell 2. A pressure detector 12a and a flow rate detector 12b for detecting, respectively, the pressure and flow rate of air supplied to the cathode side are provided in the inlet side piping 12 on the cathode side of fuel cell 2. Detection signals outputted from the respective detectors 11a, 12a, 12b are inputted into the control unit 7.

In addition, generated current taken out of the fuel cell 2 is inputted into the current controller 5 provided with, for example, a DC-DC chopper. The electricity storage unit 6 constituted by, for example, an electrical double layer capacitor or an electrolytic capacitor is connected to the current controller 5.

The current controller 5 controls the current value or generated current taken out of the fuel cell 2 based on a current command value outputted from the control unit 7 or an electricity generation command for the fuel cell 2. The current controller 5 also detects generated current actually taken out of the fuel cell 2 and inputs a detection value so detected into the control unit 7.

Furthermore, the hydrogen sensor 4 is attached to a vertically upper portion of the outlet side piping 14 on the cathode side so as to confirm that no hydrogen is discharged to off-gas which flow in the outlet side piping 14.

Figure 2:
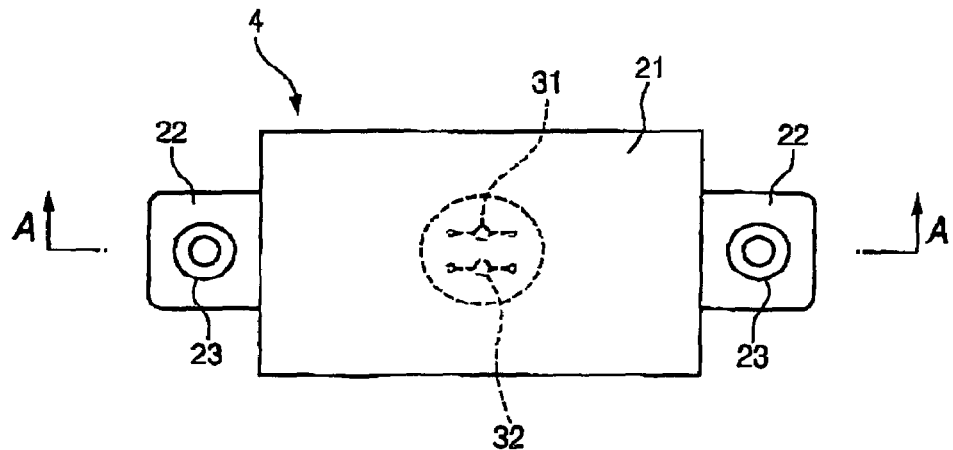
FIG. 2 is a plan view of a hydrogen sensor shown in FIG. 1.
Figure 3:
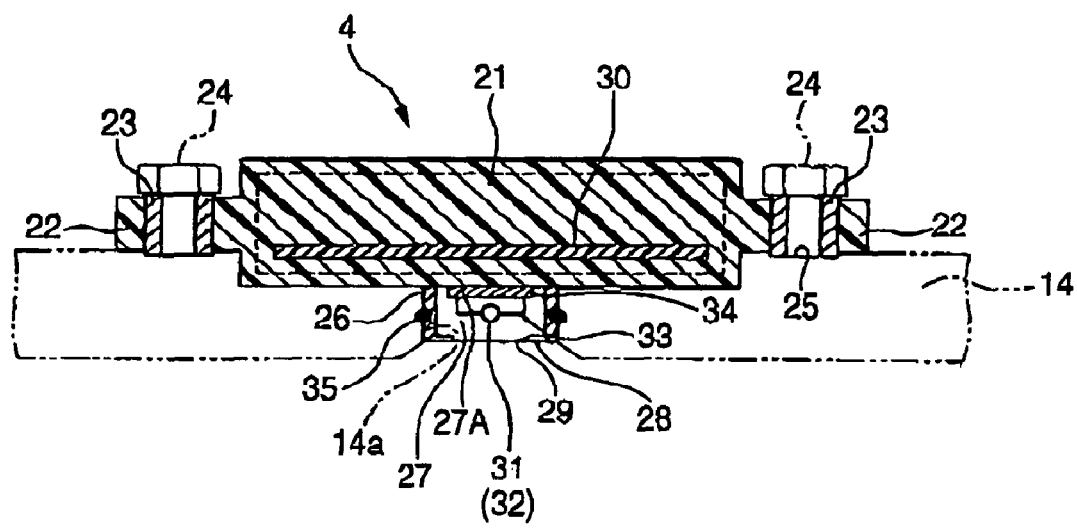
FIG. 3 is a schematic sectional view taken along the line A-A in FIG. 2.

The hydrogen sensor 4 is made to be, for example, a gas contact combustion-type hydrogen sensor and has, as shown in FIGS. 2 and 3, a rectangular prism-like case 21. The case 21 is made from, for example, polyphenylene sulfide and has flange portions 22 at both longitudinal ends thereof. A collar 23 is attached to the flange portion 22, and a bolt 24 is passed through the collar 23 so as to be tightened and fixed into each mounting seat 25 provided on the outlet side piping 14 on the cathode side.

In addition, as shown in, for example, FIG. 3, a tubular portion 26 is formed on a lower side of the case 21, and a gas detection chamber 27 is formed in the interior of the tubular portion 26. A flange portion 28 is formed on an interior side of the gas detection chamber 27 in such a manner as to extend inwardly. A gas introducing portion 29 is formed to be opened in an inner circumferential portion of the flange portion 28.

A circuit board 30 sealed with a resin is provided inside the case 21. A detection element 31 and a temperature compensation element 32 which are disposed in the interior of the tubular portion 26 are connected to the circuit board 30. Then, the respective elements 31, 32 are disposed a certain distance apart from or at a certain height above a base 34 disposed on a bottom 27A of the gas detection chamber 27 in a thickness direction of a hydrogen sensor main body and apart from each other at a predetermined interval by means of a plurality of or, for example, four pins 33.

In addition, a seal material 35 is attached to an outer circumferential surface of the tubular portion 26 so as to closely contact an inner circumferential wall of a through hole 14a in the outlet side piping 14 to thereby ensure airtightness.

Figure 4:
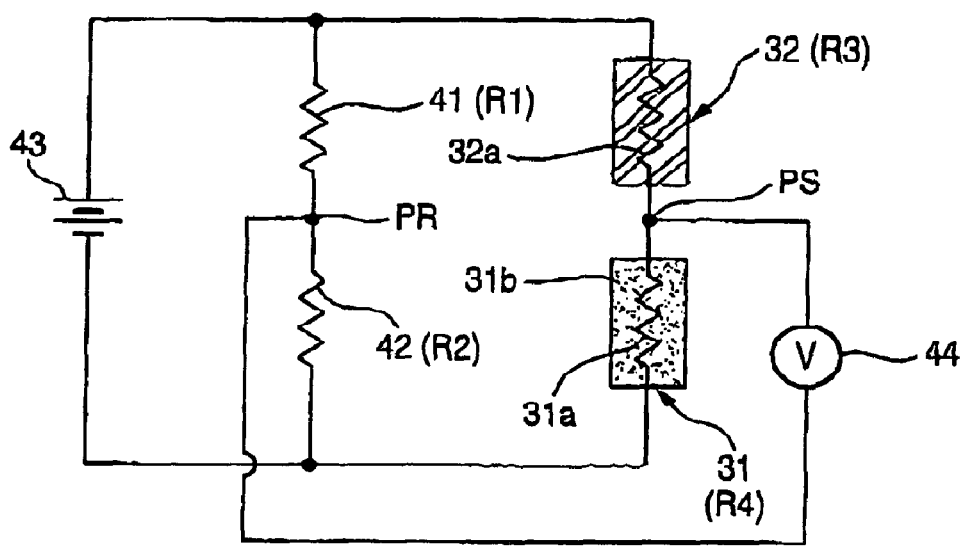
FIG. 4 is a drawing showing a bridge circuit formed by connecting a detection element with a temperature compensating element.

The detection element 31 is a known element and is formed, as shown in, for example, FIG. 4, by coating the surface of a coil 31a of a metallic wire including platinum having a high temperature coefficient relative to electrical resistance with a carrier such as alumina which carries a catalyst 31b comprising a noble metal which is active to hydrogen as a gas to be detected.

The temperature compensation element 32 is made to be inactive to the gas to be detected and is formed, for example, by coating the surface of a coil 32a which is equivalent to the detection element 31 with a carrier such as alumina.

Then, the density of hydrogen is designed to be detected by utilizing a difference in electrical resistance value between the detection element 31 which is heated to a high temperature by heat generated from a combustion reaction produced when hydrogen which is a gas to be detected is brought into contact with the catalyst 31b and the temperature compensation element 32 which produces no combustion reaction by the gas to be detected and which is hence at the ambient temperature and offsetting a change in electrical resistance value by the ambient temperature. In other words, the density of hydrogen is detected by utilizing a value obtained by subtracting a difference in electrical resistance value between the detection element 31 and the temperature compensation element 32 in the event that no gas to be detected exists in gases introduced into the gas detection chamber 27 from a difference in electrical resistance value between the detection element 31 and the temperature compensation element 32 in the event that the gas to be detected exists in gases introduced into the gas detection chamber 27.

As shown in, for example, FIG. 4, in a bridge circuit in which a branch arm formed by connecting the detection element 31 (resistance value R4) and the temperature compensation element 32 (resistance value R3) in series and a branch arm formed by connecting a fixed resistance 41 (resistance value R1) and a fixed resistance 42 (resistance value R2) in series are connected in parallel relative to a power supply 43, a voltmeter 44 is connected between a contact PS between the detection element 31 and the temperature compensation element 32 and a contact PR between the fixed resistances 41, 42 for detecting a voltage between these contacts PS, PR.

Here, in the event that no hydrogen which is a gas to be detected exists in gases introduced into the gas detection chamber 27 for inspection, the bridge circuit is balanced to be in a state where $R1 \times R4 = R2 \times R3$, and the output from the voltmeter 44 becomes zero. In contrast, in the event that hydrogen exists, hydrogen burns on the catalyst 31b of the detection element 31, and the temperature of the coil 31 is increased, whereby the resistance value R4 is increased. On the other hand, in the temperature compensation element 32, hydrogen does not burn and hence the resistance value R3 does not change. This breaks the equilibrium in the bridge circuit, and an appropriate voltage which tends to change to increase as the density of hydrogen changes to increase is then applied to the voltmeter 44. A detection value of voltage which is outputted from this voltmeter 44 is outputted to the control unit 7. Then, in the control unit 7, a map of pre-set hydrogen density is retrieved as the voltage detection value changes, whereby the density of hydrogen is calculated.

Here, the memory unit 8 stores maps of predetermined determination threshold values for detection values detected by the hydrogen sensor 4 according to the operating state of the fuel cell 2 such as a differential pressure between the anode and the cathode which is understood to be a difference in pressure between the reaction gases at the anode and the cathode, the operating pressure which is understood to be the pressure of fuel gas supplied to the anode or the pressure of gas containing oxygen supplied to the cathode, generated current of the fuel cell and the flow rate of the reaction gases.

For example, determination threshold values are set in the map of predetermined determination threshold values, and the determination threshold values tend to change to decrease in association with the decrease in loaded state of the fuel cell 2 such as the decrease in generated current of the fuel cell 2 and the decrease in pressure of the reaction gases supplied to the fuel cell 2. By doing this, for example, even in the event that an abnormality is occurred in the fuel cell 2, the excessive progress of the abnormal state so occurred is designed to be prevented.

The control unit 7 retrieves the maps stored in the memory unit 8 based on the differential pressure between the anode and the cathode and the operating pressure which are calculated based on signals inputted from the respective pressure detectors 11a, 12a, and detection values of the flow rate of the reaction gases and the generated current of the fuel cell 2 which are inputted from the flow rate detector 12b and the current controller 5, and obtains a predetermined determination threshold value. Then, the detection value outputted from the hydrogen sensor 4 and the determination threshold value obtained from the memory unit 8 are compared, and in the event that the detection value is determined to exceed the determination threshold value, a predetermined protecting process is implemented for the fuel cell 2.

In this protection process, the differential pressure between the anode and the cathode and the operating pressure of the fuel cell 2 and the flow rate of the reaction gases supplied to the fuel cell 2 are decreased by controlling, for example, the anode side pressure and flow rate regulator 9a provided in the inlet side piping 11 on the anode side of the fuel cell 2, the cathode side pressure and flow rate regulator 9b provided in the inlet side piping 12 on the cathode side of the fuel cell 2 and the air compressor 3, and the generated current of the fuel cell 2 is decreased by controlling the current controller 5.

The fuel cell protection apparatus 1 according to the embodiment has the construction as described above, and next the operation of the fuel cell protection apparatus 1, or a method for protecting the fuel cell will be described by reference to the accompanying drawings.

Figure 5:
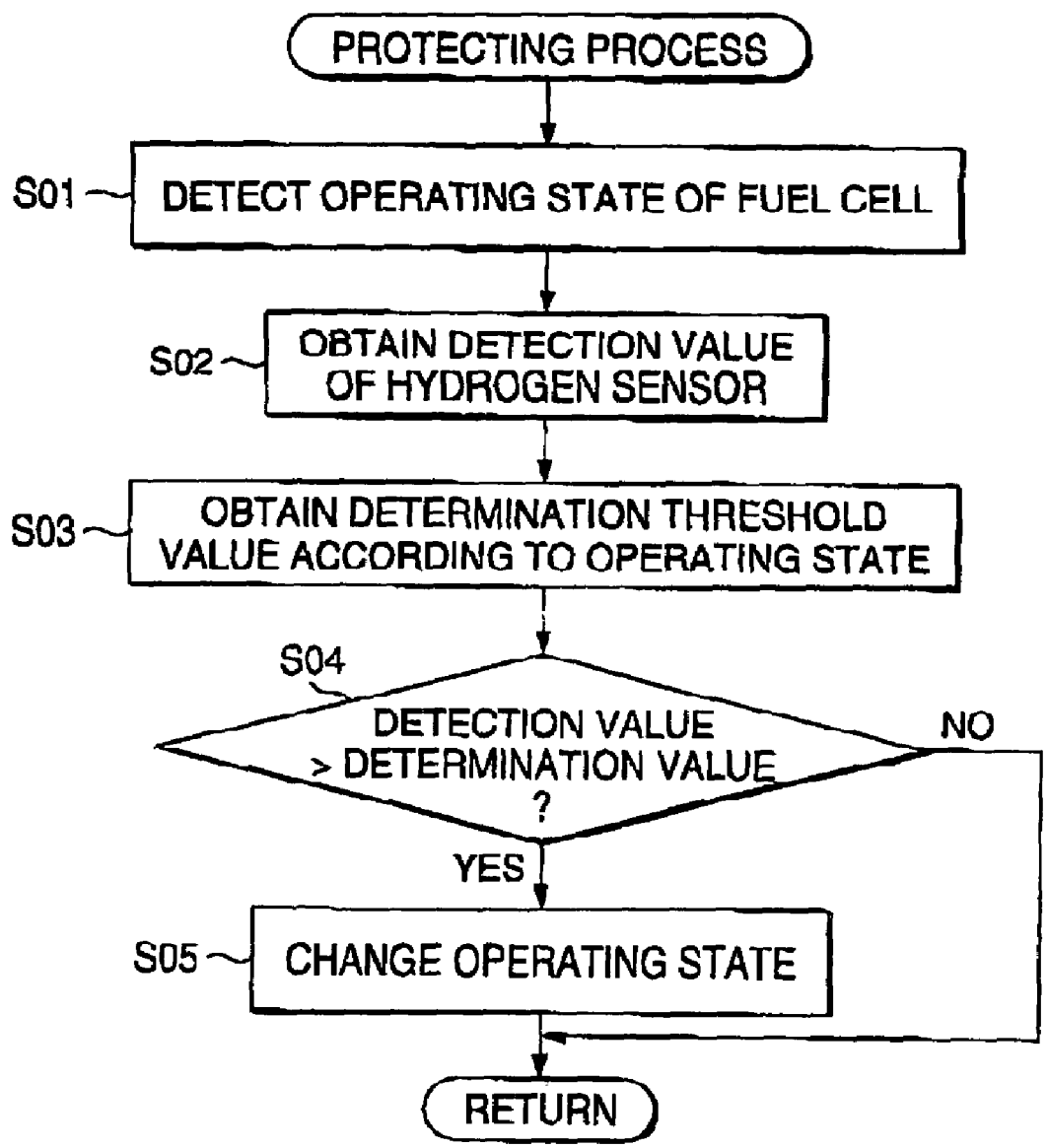
FIG. 5 is a flowchart showing an operation of the fuel cell protection apparatus shown in FIG. 1.

Firstly, in step S01 shown in FIG. 5, while the fuel cell 2 is in operation, the control unit 7 obtains detection signal from the respective pressure detectors 11a, 12a to calculate, for example, a differential pressure between the anode and the cathode and an operating pressure as the operating state of the fuel cell 2, or obtains a detection signal of the reaction gas flow rate from the flow detector 12b and a detection signal of the generated current from the current controller 5.

In step S02, the control unit 7 obtains a detection value of voltage from the hydrogen sensor 4.

In step S03, the control unit 7 obtains the respective determination threshold values according to the operating state of the fuel cell 2 from the memory unit 8.

In step S04, the control unit 7 determines whether or not the detection value of voltage outputted from the hydrogen sensor 4 is larger than the determination threshold value obtained from the memory unit 8 according to the operating state of the fuel cell 2.

In case the result of the determination is "NO", the series of processes ends.

In contrast, the result of the determination is "YES", then, advance to step S05, where the differential pressure between the anode and the cathode and the operating pressure of the fuel cell 2, the flow rate of the reaction gases supplied to the fuel cell 2 and the generated current that the fuel cell 2 is required to generate are decreased, and the series of processes ends.

Figure 6:
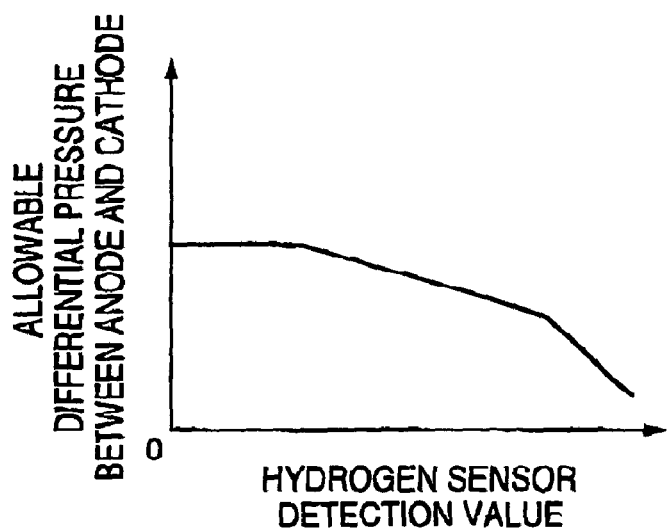
FIG. 6 is a graph showing an example of change in an allowable differential pressure between an anode and a cathode which changes according to detection values outputted from the hydrogen sensor.
Figure 7:
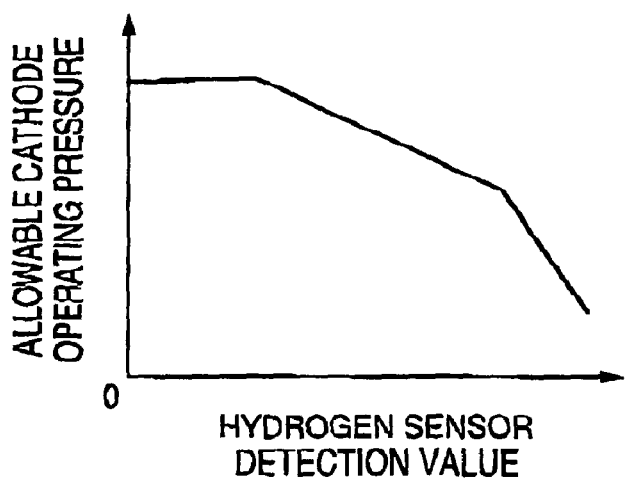
FIG. 7 is a graph showing an example of change in an allowable cathode operating pressure which changes according to detection values outputted from the hydrogen sensor.
Figure 8:
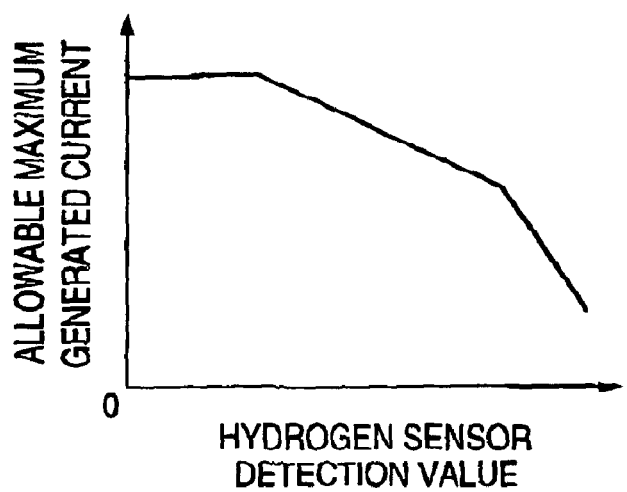
FIG. 8 is a graph showing an example of change in an allowable maximum generated current which changes according to detection values outputted from the hydrogen sensor.

As shown in, for example, FIGS. 6 to 8, the memory unit 8 stores therein the maps of the allowable differential pressure between the anode and the cathode, the allowable cathode operating pressure and the allowable maximum generated current which tend to decrease as the detection value of voltage outputted from the hydrogen sensor 4 increases. In changing the operating state of the fuel cell 2 in step S05 as has been described above, the differential pressure between the anode and the cathode, the operating pressure and the generated current are set at values which do not exceed the respective allowable values according to the detection value of voltage outputted from the hydrogen sensor 4.

As has been described heretofore, according to the fuel cell protection apparatus 1 according to the embodiment of the invention, the occurrence of an abnormal state in the fuel cell 2 can appropriately be determined by comparing the detection value outputted from the hydrogen sensor 4 with the predetermined threshold values which are set according to the operating state of the fuel cell 2. Therefore, when an abnormal state occurs, the appropriate protection process can be implemented quickly.

Moreover, since the predetermined determination threshold values are set so as to change to decrease as the loaded state of the fuel cell 2 decreases, in particular, in the event that an abnormality occurs in a state in which the loaded state of the fuel cell 2 is in a relatively low state, the excessive progress of the abnormal state is prevented, whereby the suitable protection process can be implemented more quickly.

In addition, the density of hydrogen at another location of the fuel cell system 2a may be estimated based on a detection value outputted from the hydrogen sensor 4 provided, for example, in the outlet side piping 14 on the cathode side, and this estimated value may be compared with the predetermined determination threshold value to determine whether or not an abnormal state occurs in the fuel cell 2.

In addition, in the embodiment described above, while the circuit formed by connecting the respective elements 31, 32 is made to be the bridge circuit, the invention is not limited to this. It may take another type of circuit such as a series circuit, and a detection value of voltage or current between predetermined contacts may be outputted to the control unit 7 as a state amount related to the detection value of the hydrogen sensor 4 or the resistance value R4 of the detecting element 31.

For example, when attempting to detect an inter-terminal voltage of the detecting element 31 in a state where a predetermined voltage is applied to a series circuit provided with the detecting element 31 and an appropriate element whose resistance value increases as the density of hydrogen increases, in the event that the density of hydrogen increases, since the voltage drop at the detecting element 31 increases relatively in this series circuit, in the event that the detection value of the inter-terminal voltage so obtained is larger than the predetermined determination threshold value, the operating state of the fuel cell 2 is changed.

In addition, for example, when attempting to detect a current energized to the detecting element 31 in a state where a predetermined current is supplied to a parallel circuit formed by connecting the detecting element 31 with an appropriate element whose resistance value increases as the density of hydrogen increases in parallel by a constant-current bias circuit, in the event that the density of hydrogen increases, since the current energized to the detecting element 31 decreases relatively in the parallel circuit, the operating state of the fuel cell 2 is changed when a detection value of the current is lower than the predetermined determination threshold value.

As has been described heretofore, according to the fuel cell protection apparatus of the first aspect of the invention, an occurrence of an abnormal state in the fuel cell can appropriately be determined by comparing the detection value outputted from the hydrogen sensor with the predetermined determination value which is set according to the operating state of the fuel cell, whereby the appropriate protecting process can be implemented immediately the abnormal state occurs.

Furthermore, according to the fuel cell protection apparatus of the second aspect of the invention, in the event that the fuel cell is determined an being in an abnormal state by the abnormality determining unit, the excessive progress of an abnormal state occurring in the fuel cell or in the proton-exchange electrolyte membrane can be prevented in an ensured fashion by decreasing at least one of the differential pressure between the reaction gases at the anode and the cathode, the supply pressure of the reaction gases, the supply flow rate of the reaction gases, and the generated current of the fuel cell by the protecting unit.

What is claimed is:

1. An apparatus for protecting a fuel cell which generates electricity by supplying as reaction gases hydrogen to an anode and oxygen to a cathode for electrochemical reaction, the apparatus comprising:

a hydrogen sensor for detecting hydrogen in off-gas discharged from the cathode;

an operating state detecting unit separate and distinct from the hydrogen sensor, wherein the operating state detecting unit includes a pressure detector for detecting the pressure of the reaction gases supplied to the anode and the cathode, a flow rate detector for detecting the flow rate of the reaction gases supplied to the anode and the cathode and a current controller for detecting a generated current of the fuel cell;

a memory unit for storing a determination threshold value which changes according to an operating state of the fuel cell during operation of the fuel cell, wherein the determination threshold value decreases when a loaded state of the fuel cell decreases;

a control unit coupled to the operating state detecting unit, the control unit configured to determine an abnormal state of the fuel cell by comparing a detection value outputted from the hydrogen sensor and the determination threshold value obtained from the memory unit according to the detected operating state of the fuel cell and determining that the fuel cell is in the abnormal state if the detection value exceeds the determination threshold value, wherein the control unit determines the operating state of the fuel cell based on a plurality of detections supplied to the control unit by the operating state detecting unit, the detections comprising a detection of the pressure of the reaction gases supplied to the anode and the cathode, a detection of the flow rate of the reaction gases supplied to the anode and the cathode and a detection of the generated current of the fuel cell; and a protecting unit for changing the operating state of the fuel cell if the control unit determines that the fuel cell is in the abnormal state.

2. An apparatus for protecting a fuel cell as set forth in claim 1, wherein the protecting unit reduces at least one of the difference in pressure between the reaction gases at the anode and the cathode, supply pressure of the reaction gases, supply flow rate of the reaction gases and generated current of the fuel cell.

3. A method for protecting a fuel cell which generates electricity by supplying as reaction gases hydrogen to an anode and oxygen to a cathode for electrochemical reaction, the method comprising:

detecting hydrogen in off-gas discharged from the cathode;

detecting a pressure of the reaction gases supplied to the anode and the cathode, a flow rate of the reaction gases supplied to the anode and the cathode, and a generated current of the fuel cell;

detecting an operating state of the fuel cell based on a detection of the pressure of the reaction gases supplied to the anode and the cathode, the flow rate of the reaction gases supplied to the anode and the cathode, or the generated current of the fuel cell;

obtaining a determination threshold value corresponding to the detected operating state of the fuel cell, wherein the determination threshold value decreases when a loaded state of the fuel cell decreases;

comparing a detection value of the hydrogen in the off-gas and the determination threshold value changing according to the detected operating state of the fuel cell during operation of the fuel cell;

determining that the fuel cell is in an abnormal state if the detection value exceeds the determination threshold value; and changing the operating state of the fuel cell if the fuel cell is determined to be in the abnormal state.

4. A method for protecting a fuel cell as set forth in claim 3, wherein the operating state changing step includes reducing at least one of the difference in pressure between the reaction gases at the anode and the cathode, supply pressure of the reaction gases, supply flow rate of the reaction gases and generated current of the fuel cell.

5. An apparatus for protecting a fuel cell as set forth in claim 1, wherein the operating state of the fuel cell includes a differential pressure between the reaction gases at the anode and the cathode, a supply pressure of at least one of the reaction gasses, a supply flow rate of at least one of the reaction gasses, or a generated current of the fuel cell.

6. A method for protecting a fuel cell as set forth in claim 3, wherein the operating state of the fuel cell includes a differential pressure between the reaction gases at the anode and the cathode, a supply pressure of at least one of the reaction gasses, a supply flow rate of at least one of the reaction gases, or a generated current of the fuel cell.

* * * * *